United States Patent

Swann

[15] 3,653,314
[45] Apr. 4, 1972

[54] TWIN LENS PARALLAX FREE CAMERA SYSTEM

[72] Inventor: Carl C. Swann, 1334 Belmeade Forest, Kingsport, Tenn. 37664

[22] Filed: Mar. 9, 1970

[21] Appl. No.: 17,548

[52] U.S. Cl. .......................................... 95/44 A, 352/139
[51] Int. Cl. ................................. G03b 3/00, G03b 3/04
[58] Field of Search ............... 95/11, 11 V, 12.2, 44, 45, 95/18, 39; 355/44, 45; 352/139, 140

[56] References Cited

UNITED STATES PATENTS 2,153,892  4/1939  Jackman ...................... 95/12.20 UX
2,530,793  11/1950  Thomas .......................... 95/18 X
852,476  5/1907  Verbeck ............................ 95/18
1,733,511  10/1929  Mueller ............................ 95/44

Primary Examiner—Samuel S. Matthews
Assistant Examiner—Robert P. Greiner
Attorney—Sughrue, Rothwell, Mion, Zinn & Macpeak

[57] ABSTRACT

A camera system having a picture taking lens and a view finder lens positioned at some suitable angle to each other and a reflector positioned between the lenses at an angle bisecting the angle formed with respect to a line through the center of each lens used as a means of focusing the camera system and movable out of the path of the picture taking lens before actuation of the camera shutter.

9 Claims, 3 Drawing Figures

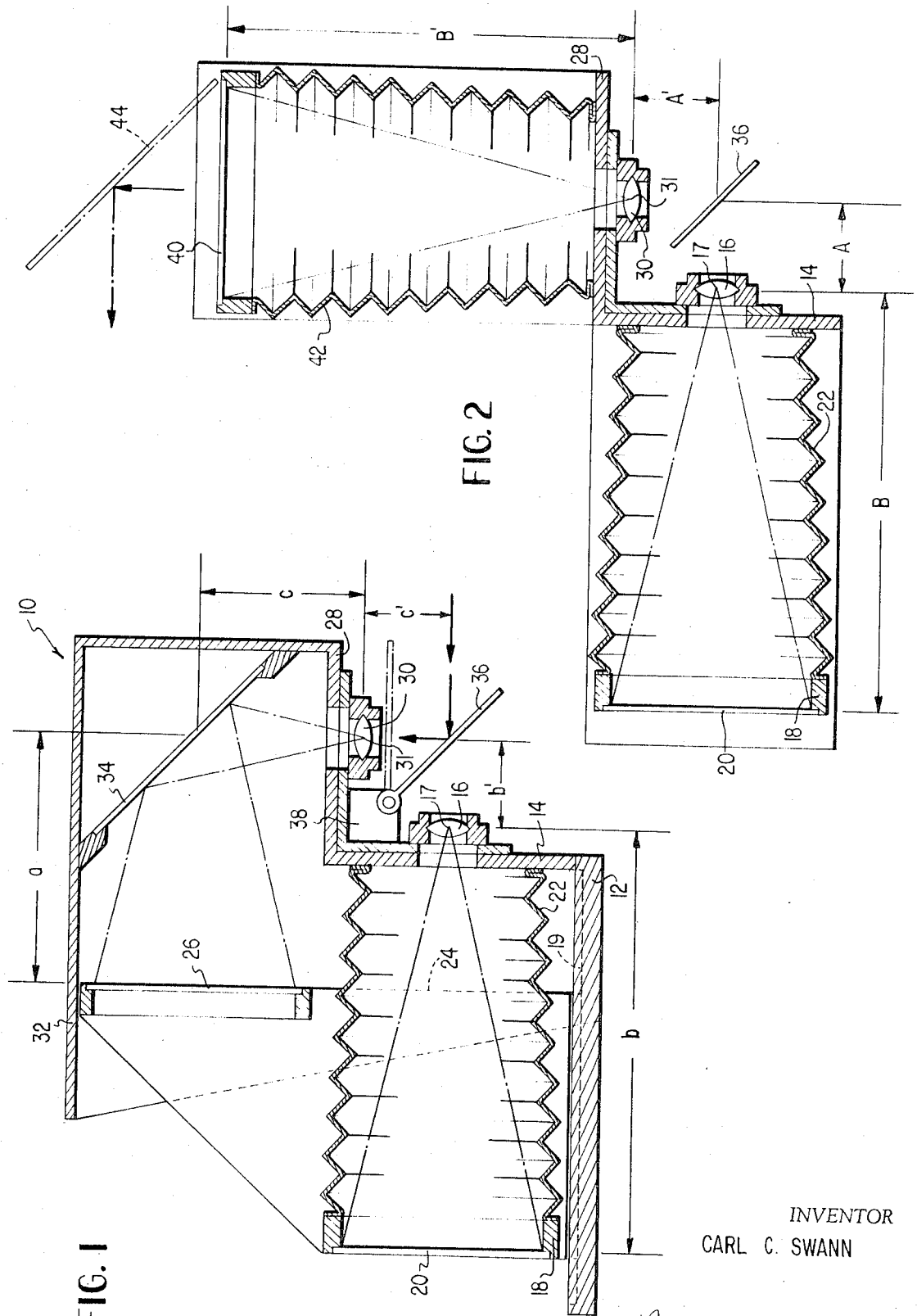

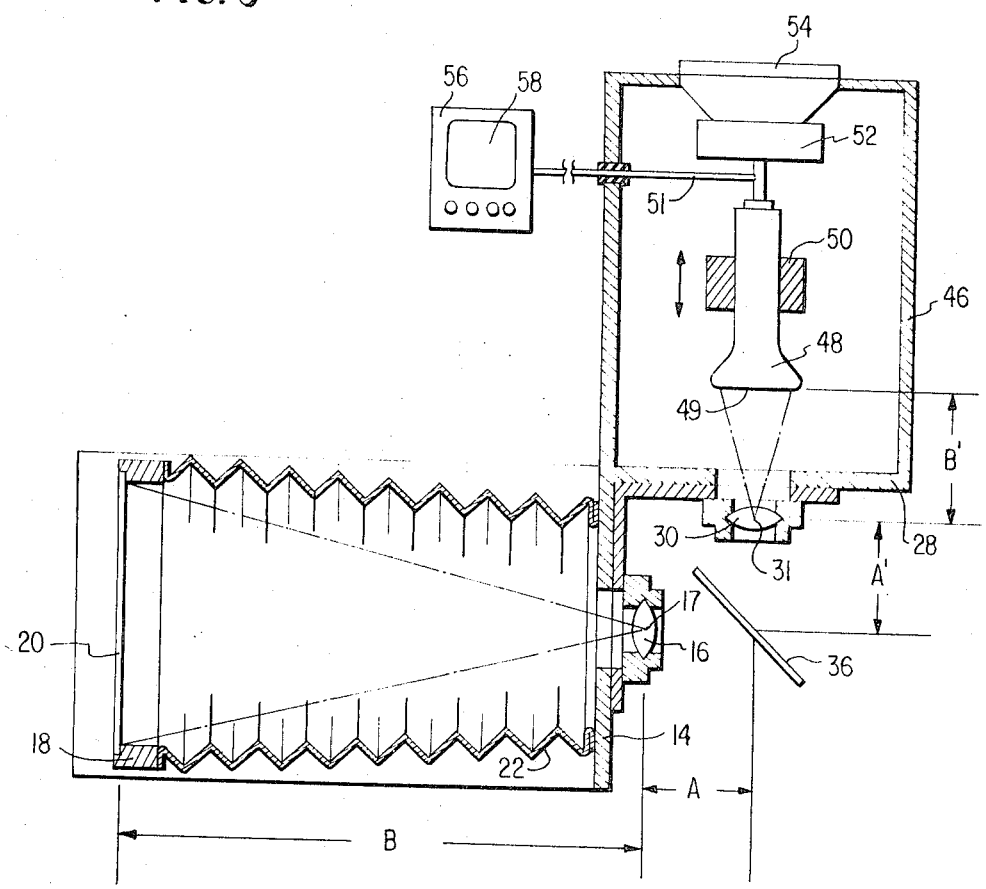

TWIN LENS PARALLAX FREE CAMERA SYSTEM

BACKGROUND OF THE INVENTION

1. Field of the Invention

This invention relates to a camera system having a separate view finder lens and a picture taking lens which can take pictures having no parallax.

2. Description of the Prior Art

The heretofore unsolved problem of taking photographic pictures having absolutely no parallax is well known in the art of photography. This problem is peculiar to cameras which utilize two lenses, one lens of which serves as the view finder lens and the other of which serves as the picture taking lens. Parallax simply stated is the angular displacement or shift when the object is viewed first through the view finding lens and then is viewed through the picture taking lens. The phenomena of parallax results from the fact that since the view finding lens and the picture taking lens are separated by a distance, a common center line cannot exist between the view finder lens and the picture taking lens.

The problem of parallax does not exist when a single lens is used which serves as both the picture taking lens as well as the view finding lens. One such camera is the basic view type camera which has a front standard having a single lens, a back standard having a ground glass focusing screen and means for accepting a film holder and a bellows connecting the front and back standards. The basic view type camera is used for fine portraiture, commercial and architectural photography because the exact image shown on the ground glass will be that photographed. These basic view cameras have numerous drawbacks in that they are slow in operation in that after the subject to be photographed has been framed on the focusing screen, the shutter must be closed, set and cocked, a film holder must be inserted and the dark slide removed before the shutter can be released to complete the exposure.

Another type of camera is that of the reflex type wherein a single lens serves as both the view finding lens and the picture taking lens. The reflex type camera employs a mirror which is positioned between the camera lens and the film and focal plane shutter to reflect the subject to be photographed to a viewing screen. After the subject has been framed in the viewing screen the mirror is moved out of the path of the shutter just before the shutter is opened to take the picture. The reflex type camera is less bulky than the basic view type camera, however, the noise and time lag associated with the mechanisms which must operate before the opening of the shutter is considerable and very distracting which in larger format cameras is intolerable.

A further type of camera is the twin lens reflex type which has definite advantages in that, with the subject in the appropriate position, the lights and exposure evaluated, the shutter may then be set and cocked and the diaphragm adjusted on the taking lens, before composing and focusing the subject on the ground glass viewing screen through the always open focusing lens. However, these twin lens reflex cameras have the disadvantage of accute parallax especially when used for extreme closeup work where the subject may be completely missed by the taking lens or have a definitely different perspective or point of view even though it is apparently properly framed and composed on the focusing screen.

The twin lens camera system of the present invention eliminates the disadvantages of the aforementioned camera systems while at the same time providing a camera which is inexpensive to manufacture and which can be used for both closeup as well as distant photography without the serious problem of parallax being present.

SUMMARY OF THE INVENTION

This invention provides a twin lens camera for use in both closeup and distant photography work which is free of parallax. The invention preferably incorporates the use of two lenses having the same focal length. In one of the embodiments, the picture taking lens is mounted on a front standard and a back standard containing the photographic film is connected to the front standard by means of a bellows and is movable with respect to the front standard as the camera is focused. A second lens, the view finder lens, is mounted on the front standard such that the central axis of the view finder lens is perpendicular to the central axis of the picture taking lens. A focusing screen is positioned above the back standard and moves with it. A plane parallel to the front of the focusing screen is also perpendicular to the center line through the picture taking lens. A front surface mirror or other like reflecting device is positioned through the intersecting point of the center lines of the picture taking and view finding lenses at a 45° angle with respect to both of these center lines. An additional front surface mirror is positioned behind the view finding lens to thereby reflect the light passing through the image finding lens to the focusing screen. Inasmuch as the focal length of both the picture taking lens and the view finding lens is the same, the distance between the focal point of the picture taking lens to the surface of the photographic film will be identical to the distance between the focal point of the view finding lens to the surface of the focusing screen via the mirror because the back standard and the focusing screen move as one during focusing of the camera.

During the focusing operation of the camera, the reflecting surface positioned between the view finding and picture taking lenses is at an angle of 45° with respect to the central axis of both of the lenses. The light from the subject and object to be photographed is reflected from this surface through the focusing lens to the mirror behind it and from there to the focusing screen. At the instant the proper composition and the focus are obtained on the focusing screen (assuming the picture taking lens and shutter adjustments having been preset), the reflecting surface between the picture taking lens and view finding lens is moved out of the path of the picture taking lens by any suitable means and the film is exposed. The picture taken is identical to the subject matter framed on the focusing screen and has no parallax.

A second embodiment of the present invention eliminates the necessity of using the reflecting surface positioned between the view finding lens and the focusing screen. The picture taking lens and viewfinding lens are positioned at a suitable angle with respect to each other in the same manner as the same lenses in the preferred embodiment. The front and back standards which hold the picture taking lens and photographic film respectively are connected by means of a conventional bellows as are the front standard and back standard which contain the view finding lens and focusing screen respectively. The back standard containing the photographic film and the back standard containing the focusing screen are both moved toward and away from their respective front standards the same amount during the focusing operations so that the distance between the focal point of the picture taking lens and the surface of the film is always the same as the distance between the focal point of the view finding lens and the focusing screen when lenses having the same focal length are used as both picture taking lens and the view finding lens. The second embodiment does, however, lend itself more readily to the use of a picture taking lens having a focal length different from that of the view finding lens as long as the distances between the focal point of the picture taking lens and the surface of the photographic film is kept proportional to the distance between the focal point of the view finding lens and the surface of the focusing screen. This concept also permits the use of very short focus lenses.

A third embodiment of the present invention is similar to the second embodiment. However, the bellows and focusing screen are eliminated and a video or television transmitting tube is positioned behind the view finding lens. The video transmitting tube is mounted within a housing and movable conjointly with the back standard holding the photographic film. The focal length of the view finding lens and picture taking lens may be different from each other as in the second embodiment as long as the distance between the focal point of the picture taking lens and the photographic film is kept proportional to the distance between the focal point of the view finding lens and the signal plate of the video transmitting tube.

The electrical output signal of the video transmitting tube, which signal contains the image as viewed through the view finding lens, is fed to a video or television receiver for viewing. The video receiver and its display screen can be mounted in the same housing which contains the video transmitting tube or it can be set up in a remote location. As can be seen, the third embodiment just described readily lends itself to closed circuit television viewing or surveillance with the added feature that whenever a permanent parallax free record of the area or object under surveillance is desired, all that need be done is to actuate the shutter mechanism associated with the picture taking lens to thereby remove the reflecting surface and expose the photographic film. In addition, by rapidly moving the reflecting surface into and out of the path of light entering the picture taking lens and by stepping the photographic film in synchronism therewith, a permanent parallax free record can be obtained in the form of movie film.

The reflecting device used in all three embodiments which is positioned at an angle to bisect the angle at the intersection of the center lines of the picture taking and view finding lenses can be a light weight metallic front surface mirror which could be rotated, slid or hinged to swing out of the path of the picture taking lens before the shutter is opened. Design of mechanisms for rotating, swinging or sliding the reflecting device into and out of the path of the picture taking lens are too numerous for description in the present application. The reflecting means could also be a partial mirror or beam splitter requiring no moving parts which would considerably increase the operational speed of the camera but would result in a reduction in the transmission value of both the viewing and exposing light received. A further example of a light reflecting means could be devices which utilize the Kerr magneto-optic or electro-optic effect.

BRIEF DESCRIPTION OF THE DRAWINGS

FIG. 1 is a side elevation view, partly in section, of one embodiment of the twin lens camera of the present invention; and FIG. 2 is a side elevation view, partly in section of a second embodiment of the twin lens camera of the present invention.

FIG. 3 is a side elevation view, partly in section, of a third embodiment of the twin lens camera of the present invention.

DETAILED DESCRIPTION OF THE INVENTION

FIG. 1 sets forth the preferred embodiment of the twin lens parallax free camera system 10 of the present invention having a base 12. A front standard 14 is mounted perpendicular to the base 12 and supports a picture taking lens 16. A back standard 18 is mounted on the base 12 parallel to the front standard 14 and is movable toward and away from the front standard 14 by any suitable means such as a conventional rack and pinion wheel (not shown). The back standard 18 moves a guide track means 19 and supports the photographic film 20. The bellows 22 made of cloth or other suitable material is positioned between and has its ends secured to the front standard 14 and back standard 18, respectively, in order to concentrate all of the light passing through the picture taking lens 16 onto the photographic film 20. A support member 24 is also mounted on the adjustable back standard 18 and has a focusing screen 26 mounted thereon.

The front standard 14 has a member 28 extending outwardly from and perpendicular to the plane of the front standard 14 for supporting a view finding lens 30. A housing 32 forms a chamber with the view finding lens support member 28 and the base 12 and encloses the focusing screen 26. A mirror 34 is mounted within the housing 32 in order to reflect the light passing through the view finding lens 30 to the focusing screen 26. Inasmuch as the back standard 18 and focusing screen support member 24 move together the distance between the photographic film 20 and focusing screen 26 remains constant during the focusing operation of the camera. The distance between the photographic film 20 and the focusing screen 26 is chosen such that the distance ($b$) between the focal point 17 of the picture taking lens 16 and the photographic film 20 is always equal to the sum of the distances ($a$) and ($c$) between the focal point 31 of lens 30, the surface of the mirror 34, and the focusing screen 26 during the focusing and picture taking operation of the camera.

A reflecting surface 36 is movably mounted between the picture taking lens 16 and the view finding lens 30 at a 45° angle with respect to both a center line through the focal point 17 of the picture taking lens 16 normal to the photographic film 20 and a center line through the focal point 31 of view finding lens 30, parallel to the focusing screen 26. The reflecting surface 36 is movable from the solid line position where it passes through the intersection of the aforementioned center lines to the phantom line position by any suitable means shown generally at 38 an instant before the shutter of lens 16 (not shown) is actuated.

The operation of the camera system set forth in FIG. 1 will now be described. Before attempting to focus the camera, the reflecting surface 36 is cocked to the solid line position wherein $b'$ equals $c'$ and the light from the subject to be photographed is reflected off of the reflecting surface 36 through the view finding lens 30 to the mirror 34 and from there to the focusing screen 26. Actuating means 38 can be connected to the camera shutter by any suitable means (not shown) such that when the reflecting surface 36 is moved to the solid line position between the lenses 16 and 30, the shutter of the camera is also cocked. The focusing screen 26 is then moved back and forth until the subject to be photographed is in focus and framed on the focusing screen. Movement of the focusing screen 26 also results in movement of the photographic film with respect to the picture taking lens 16. Thus, the distance ($b$) will always be equal to the sum of the distances ($a$) + ($c$). After the subject to be photographed is in focus, the means 38 is actuated to both move the reflecting surface 36 to the phantom line position and to actuate the camera shutter. The light from the subject to be photographed can now pass directly through the picture taking lens 16 to the photographic film 20 and a parallax free picture is taken.

Referring to FIG. 2 which shows a second embodiment of the present invention, like numerals will indicate like elements set forth with regard to the embodiment of FIG. 1. The embodiment of FIG. 2 differs from the embodiment of FIG. 1 primarily in the fact that the focusing screen 40 is positioned directly behind the view finding lens 30 at an angle with respect to the surface of the photographic film 20 rather than parallel to it as disclosed in FIG. 1.

The focusing screen 40 is connected to the view finding lens support member 28 by means of a bellows 42 in the same manner as the back standard 18 is connected to the front standard 14 by means of bellows 22. The focusing screen 40 is moved toward and away from the view finding lens 30 by means of a rack and pinion wheel (not shown) or other suitable means which also moves the back standard 18 and photographic film 20 with respect to the picture taking lens 16 such that the distance ($b$) between the focal point 17 of the picture taking lens and the photographic film 20 is always equal to the distance ($b'$) between the focal point 31 of the view finding lens 30 and the focusing screen 40.

An additional reflecting mirror 44 is positioned at a 45° angle with respect to the focusing screen 40 to enable focusing to be accomplished from the same side of the camera as that containing the photographic film 20. The reflecting mirror 44 can be eliminated if desired. The operation of the camera set forth in the embodiment of FIG. 2 is the same as that set forth above with respect to the embodiment of FIG. 1.

Referring to FIG. 3 which shows a third embodiment of the present invention, again like numerals will indicate like elements set forth with regard to the embodiments of FIGS. 1 and 2. The embodiment of FIG. 3 differs from the embodiment of FIG. 2 in that a housing 46 extends from the view finding lens support member 28 and has a video or television transmitting tube 48 movably mounted therein. The video transmitting tube 48 is similar to the conventional television camera tubes of the, for example, iconoscope, orthicon, or indicon type. The video transmitting tube 48 has a signal plate 49 which is positioned behind the view finding lens 30 in a mount 50 which mount is movable with respect to the view finding lens 30 by means, for example, of a rack and pinion wheel (not shown) in much the same manner as is the focusing screen 40 in the embodiment of FIG. 2. The electrical output signal of the video transmitting tube 48 contains the image as viewed through the view finding lens 30 and this signal is fed by means of a cable 51 to either or both a video or a television receiver 52 mounted within the housing 46 having a display screen 54 extending outside the housing 46 or to a remote video receiver 56 housing a display screen 58. The operation of the camera set forth in the embodiment of FIG. 3 is the same as that set forth above with respect to the embodiments of FIGS. 1 and 2 with the only difference being the video transmitting tube 48 and signal plate 49 are moved with respect to the view finding lens 30 during focusing rather than the focusing screens 26,40.

The reflecting surface 36 in all three embodiments can be a full front surface mirror which reflects the full amount of light from the subject to be photographed to the focusing screen or video transmitting tube but which, however, must be moved out of the way of the picture taking lens 16 as described above with respect to the embodiment of FIG. 1 before the camera shutter is opened. If the reflecting surface 36 is a partial mirror, no movement of the mirror is required inasmuch as some of the light from the subject passes through the mirror to the taking lens 16 and some of the light is reflected to the focusing lens 30. However, if a partial mirror is used and the transmission value of the mirror is equal to its reflection value, the light available for both focusing and exposing the photographic film will be reduced by at least 50 percent. A beam splitter could also be used in place of the reflecting mirror 36 with the same advantages and disadvantages set forth above with respect to the use of a partial mirror. Additional devices such as those which employ the Kerr magneto-optical or electro-optical effect can also be used in place of the reflecting mirror 36. If a partial mirror, beam splitter or Kerr device is used, it must be positioned such that it bisects the angle formed by the center line through the focal point 17 of the picture taking lens 16 and the center line through the focal point 31 of the view finding lens 30 at their point of intersection such that the distance ($b'$) is always equal to ($b$) and the distance ($a$) equals ($a'$).

It is also possible in all three embodiments of the present invention to have lenses such that ($b$) need not be equal to the sum of ($a$) and ($c$) or that (B) need not be equal to (B') as long as the focal lengths of the picture taking lens 16 and the view finding lens 30 are in proper proportion to each other. For example, if the picture taking lens 16 has a focal length of 6 inches and the view finding lens has a focal length of 3 inches, then in the embodiment of FIG. 2 (B) would be equal to 6 inches and B' would be equal to 3 inches (at infinity focus) and the mechanism for moving the focusing screen 40 and photographic film 20 would have a 2:1 movement ration. If (B) is extended to 9 inches, then (B') will be extended to 4½ inches. In the foregoing example, the focusing screen 40 would have half the diametral image size as that projected on the photographic film 20. The same would be true for B and B' in the embodiment of FIG. 3.

This invention therefore provides a camera system which is simple to operate, relatively inexpensive to manufacture and which takes parallax free pictures.

What is claimed is:

1. In a camera of the type adapted to contain photographic film, a shutter and picture taking lens means aligned with said film, comprising:
   a. film holding means movable with respect to said shutter and picture taking lens during the focusing of said camera;
   b. additional lens means mounted adjacent said picture taking lens means for focusing said camera;
   c. screen means secured to and movable conjointly with said film holding means for focusing the image as received through said focusing lens whereby movement of the screen means to focus the image thereon will simultaneously move the film holding means into focus relative to the picture taking lens; and
   d. reflecting means positioned between the front of said picture taking lens and the front of said focusing lens, said reflecting means having a first state for reflecting light through said focusing lens during the focusing operation of said camera and a second state to permit light to enter said picture taking lens during the picture taking operation of said camera.

2. A camera system as set forth in claim 1 wherein said screen means for focusing the image viewed through said focusing lens is parallel to said photographic film.

3. In a camera system as set forth in claim 1 wherein said screen means for focusing the image viewed through said focusing lens is normal to said photographic film.

4. In a camera system as set forth in claim 1 wherein said reflecting means is movable between a first position for reflecting light through said focusing lens during the focusing operation of said camera and a second position for permitting light to enter said picture taking lens during the picture taking operation of said camera.

5. In a camera system as set forth in claim 1 wherein said reflecting means is positioned in the first state at a 45° angle with respect to both a center line through the focal point of said picture taking lens and a center line through the focal point of said focusing lens.

6. In a camera system as set forth in claim 1 wherein said reflecting means in the second state is positioned at an angle other than 45° with respect to both a center line through the focal point of said picture taking lens and a center line through the focal point of said focusing lens.

7. In a camera system as set forth in claim 1 wherein said screen means further includes a video transmitting tube means movable conjointly with said film holding means for focusing the image as received by said video transmitting tube means through said focusing lens, said video transmitting tube means being connected to a video receiving means for displaying a video image transmitted by said video transmitting tube.

8. In a camera system as set forth in claim 5 wherein said reflecting means is a partial mirror.

9. In a camera system as set forth in claim 5 above wherein said reflecting means is a beam splitter.

* * * * *